(12) United States Patent
Templin et al.

(10) Patent No.: US 7,873,960 B2
(45) Date of Patent: Jan. 18, 2011

(54) GENERIC PACKAGING TOOL FOR PACKAGING APPLICATION AND COMPONENT THEREFOR TO BE INSTALLED ON COMPUTING DEVICE

(75) Inventors: David K. Templin, Issaquah, WA (US); David Andersen Guyer, Sammamish, WA (US); Michael C. Wade, Renton, WA (US); Patrick Wayne Baker, Woodinville, WA (US); Sean Conway Draine, Seattle, WA (US); Tarik Nesh-Nash, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1757 days.

(21) Appl. No.: 10/910,836

(22) Filed: Aug. 4, 2004

(65) Prior Publication Data
US 2006/0031831 A1    Feb. 9, 2006

(51) Int. Cl.
*G06F 9/445* (2006.01)
*G06F 9/44* (2006.01)

(52) U.S. Cl. .......... 717/175; 717/169; 717/120
(58) Field of Classification Search ............ None
See application file for complete search history.

(56) References Cited

U.S. PATENT DOCUMENTS

| | | | | |
|---|---|---|---|---|
| 5,950,010 A | * | 9/1999 | Hesse et al. | 717/178 |
| 6,117,187 A | * | 9/2000 | Staelin | 717/169 |
| 6,282,711 B1 | * | 8/2001 | Halpern et al. | 717/175 |
| 7,149,889 B2 | * | 12/2006 | Stalker et al. | 713/2 |
| 2003/0037328 A1 | * | 2/2003 | Cicciarelli et al. | 717/178 |
| 2004/0117609 A1 | * | 6/2004 | Stalker et al. | 713/2 |

* cited by examiner

*Primary Examiner*—Tuan Q Dam
*Assistant Examiner*—Evral Bodden
(74) *Attorney, Agent, or Firm*—Woodcock Washburn LLP

(57) ABSTRACT

To package an application and a component to be available for use in connection with the application into a package, a type of the package and a location where the package is to be stored are received, as is a selection of the component to be packaged with the application. For the selected component, at least one packaging-specific object in such component is referred to to determine information on how to package the component in the package and/or how to install the component on the computing device of the user.

23 Claims, 6 Drawing Sheets

COMPONENT 14

GLOBAL FILE OBJECT
LOCAL FILE OBJECT
PACKAGING-SPECIFIC OBJECTS:
- SYSTEM CHECKS OBJECT
- INSTALLATION CONDITIONS OBJECT
- INSTALLATION COMMAND OBJECT
- EXIT BEHAVIOR OBJECT
- REBOOT OBJECT
- DISPLAY STRING OBJECT
- SCHEDULE OBJECT
- DEPENDENCIES OBJECT
- OVERRIDES OBJECT
- |

FIG. 3

```
┌─────────────────────────────────────────┐
│        PACKAGE / BOOTSTRAPPER 16        │
│                                         │
│   -   BOOTSTRAP CODE                    │
│   -   INSTALLATION INSTRUCTIONS         │
│   -   [REFERENCE TO] APPLICATION 12     │
│   -   [REFERENCE TO] COMPONENT 14 W/    │
│       OBJECTS THEREOF                   │
│   -   [REFERENCE TO] COMPONENT 14 W/    │
│       OBJECTS THEREOF                   │
│   -   |                                 │
└─────────────────────────────────────────┘
```

FIG. 5

GENERIC PACKAGING TOOL FOR PACKAGING APPLICATION AND COMPONENT THEREFOR TO BE INSTALLED ON COMPUTING DEVICE

TECHNICAL FIELD

The present invention relates to an architecture and method for allowing a developer of an application to produce an installation package to install the application on the computing device of a user, and also to install each of one or more components for use in connection with the application. More particularly, the present invention relates to such an architecture and method whereby the developer can produce the installation package with any component necessary or desired, presuming the component is in an amenable form.

BACKGROUND OF THE INVENTION

A software application as developed for a computing device or the like may at times require installation of one or more components, either as a necessity or as desirable. For example, a media rendering application may require a particular component for the operation thereof, such as for example a graphics decoder, an audio filter, or the like, and/or may optionally include a particular component to allow the rendering application to render a particular content type, such as for example a particular type of video or audio player or the like.

Typically, each of the application and each component thereof is packaged into a separate executable installer such as for example a .exe file or a collection of files accessed by way of a batch file or the like. The process of installing such an application consists of downloading or otherwise locating and running the installer for each prerequisite or requested component, rebooting the machine as necessary, and then downloading or otherwise locating and running the installer for the application.

As should be appreciated, manually performing such a process can be tedious and complicated, especially if a relatively large number of components are to be installed along with the application, and if each component must be located from a different place. Moreover, such process can be complicated by the fact that a component should not be installed if such component is already available at the computing device on which the application is being installed, or if such component is already available at such computing device in a more current version, or if such component is known to conflict with another component on such computing device, among other things.

In the prior art, it is known to employ a packaging tool to produce a package that when executed installs the application and each of one or more components therefor. Such a package or 'bootstrapper' thus automates the installation of a multi-component application, and may for example be recognized as a file entitled 'setup.exe' or the like. However, prior art installation packages suffer from the fact that they can only install components that are supported by the developer of the packaging tool. In particular, if such packaging tool developer only supports packaging components A, B, and C with an application, an application developer cannot employ such packaging tool to package a component D with an application. Likewise, if such packaging tool developer only supports packaging a particular version of a component E with an application, an application developer cannot employ such packaging tool to package a later version of such component E with an application.

Accordingly, a need exists for a packaging tool that is extensible to support installation of almost any version of any component with an application. In particular, a need exists for a packaging system including the packaging tool and each of a plurality of components, where each component includes therewith all packaging information necessary for the packaging tool to package such component with an application. Thus, such packaging tool can package any such component with an application based on the packaging information for such component as obtained from such component.

SUMMARY OF THE INVENTION

The aforementioned needs are satisfied at least in part by the present invention in which a method is provided to package an application and each of at least one component to be available for use in connection with the application into a package, where the package is to be distributed to a user and executed on a computing device of the user to install the application and each component on such computing device. In the method, a type of the package and a location where the package is to be stored are received, as is a selection of each component to be packaged with the application. For each selected component, at least one packaging-specific object in such component is referred to to determine information on how to package the component in the package and/or how to install the component on the computing device of the user. The package is then produced based on the received type and location for the package, the received selection of each component, and the determined information from the at least one packaging-specific object of each component.

For the executed package to install the application and each component therein onto the computing device of the user, a method is provided whereby, for each component, calls are made:
  to a system checks object of the component and within the package to gather information about the computing device upon which the component is to be installed;
  to an installation conditions object of the component and within the package to determine that the component should in fact be installed on the computing device;
  to an installation command object of the component and within the package to execute a command line by which to order that the component be located and installed; and
  to an exit behavior object of the component and within the package to describe a result of the installation of the component.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 3 is a block diagram showing the contents of a component of FIG. 2 in accordance with one embodiment of the present invention;

FIG. 5 is a block diagram showing the contents of the bootstrapper of FIG. 2 in accordance with one embodiment of the present invention.

DETAILED DESCRIPTION OF THE INVENTION

Computer Environment

Figure 1:
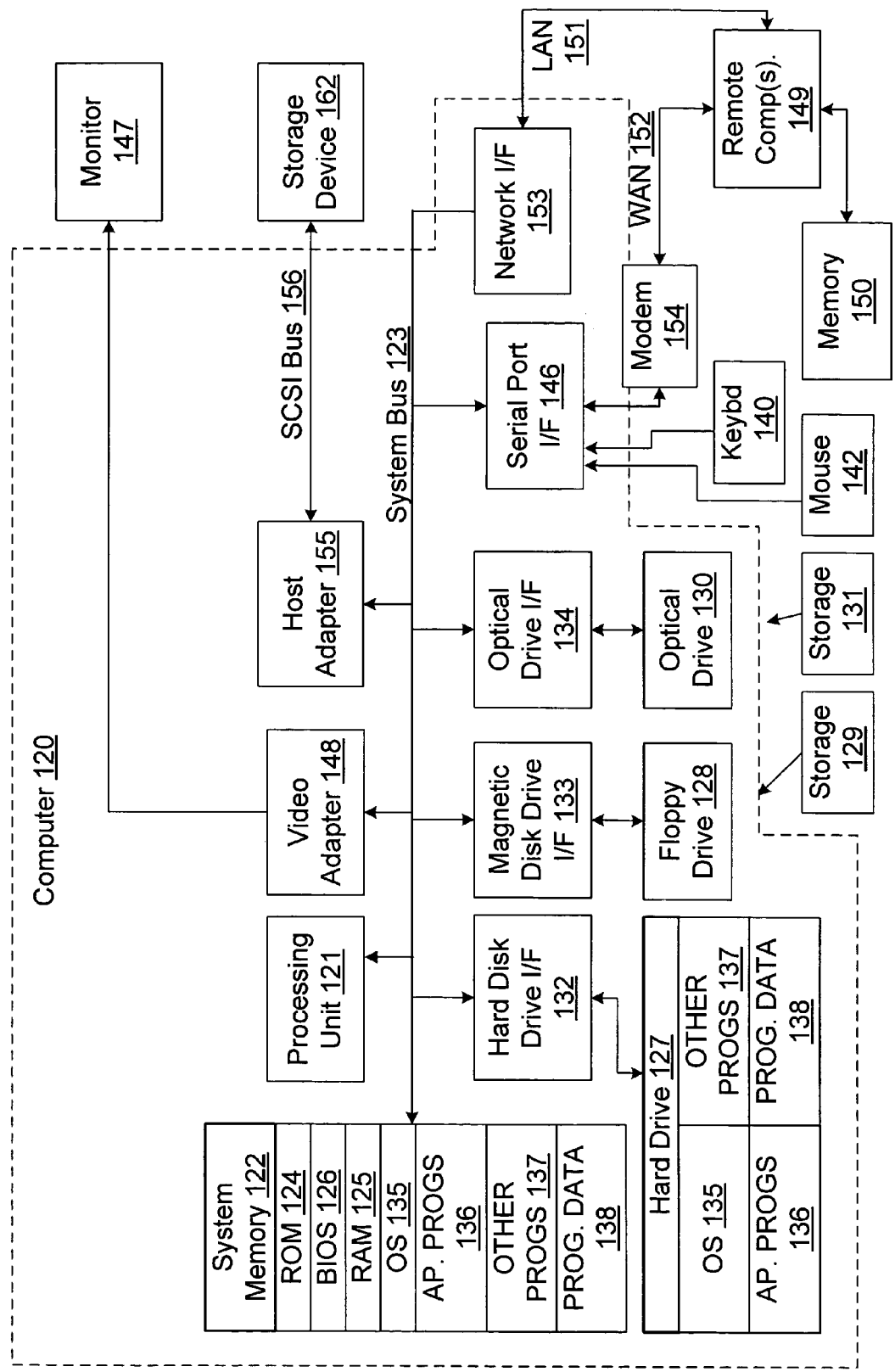
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Generic Packaging Tool and Component

Figure 2:
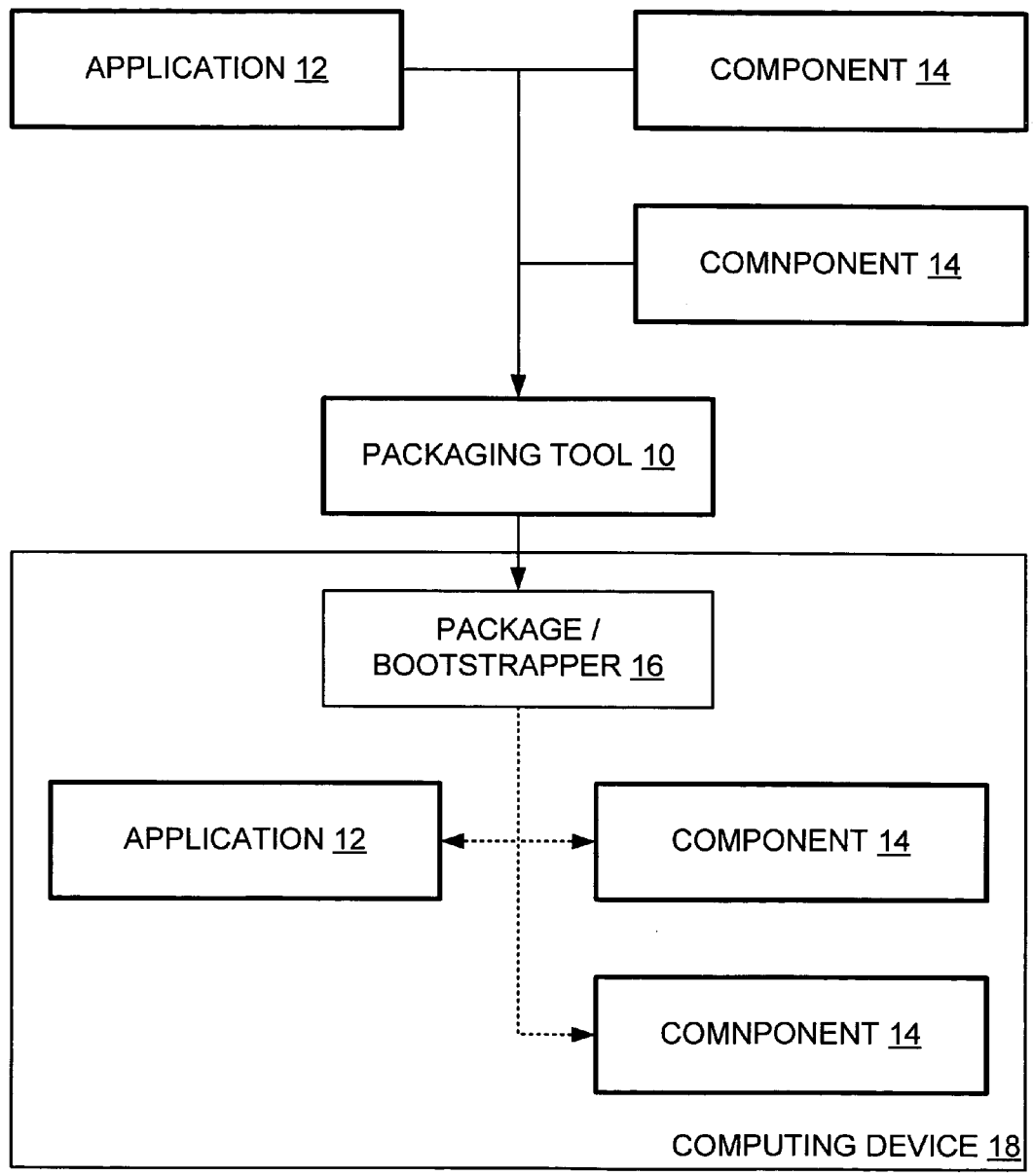
FIG. 2 is a block diagram showing a packaging tool producing a package/bootstrapper based on an application and one or more components, and the packager/bootstrapper installing the application and each component thereof on a computing device, all in accordance with embodiments of the present invention.

In the present invention, and turning now to FIG. 2, a packaging tool 10 is employed by a developer of an application 12 to package the application 12 with one or more components 14 into a package 16, where the one or more components 14 are either necessary for using the application 12 or desirable for use in connection with such application 12. The package 16 or 'bootstrapper' may be in the form of an executable or the like that is distributable to multiple users, and that when executed by a user on a computing device 18 thereof in fact installs each component 14 thereof and the application 12 thereof on the computing device 18.

The packaging tool 10 may be any appropriate packaging tool without departing from the spirit and scope of the present invention, presuming of course that such packaging tool 10 can work with each component 14 in the manner set forth herein. As will be set forth in more detail below, such packaging tool 10 can configure and produce a package or bootstrapper 16 to install an almost limitless combination of components 14 and applications 12.

Thus, the application 12 and the components 14 may be any appropriate applications and components without departing from the spirit and scope of the present invention, presuming of course that such application 12 and components 14 are amenable to be installed on the computing device 18. For example, if the application 12 is a word processing application, one component may be a necessary keyboard mapping process, while another component may be a desirable spell-checking process. Similarly, if the application 12 is an email application, one component may be a necessary email server communications process, while another component may be a desirable email address resolution process.

The bootstrapper 16 as produced by the packaging tool 10 may take any particular form without departing from the spirit and scope of the present invention, although it is to be appreciated that such bootstrapper 16 should be in a form native to the computing device 18 of the user. While such bootstrapper 16 may include therein all files or objects necessary to install the application 12 and all components 14 thereof, it may also be the case that at least some of such files and objects are to be located elsewhere, such as for example at a network location as identified within the bootstrapper 16 or in an area of a storage device of the computing device 18 again as identified within the bootstrapper 16.

The computing device 18 upon which the application 12 and components 14 thereof are to be installed by the bootstrapper 16 may be any computing device without departing from the spirit and scope of the present invention, again presuming that such computing device 18 can indeed install and run the application 12 and components 14 thereof. While the computing device 18 is typically a personal computer or the like such as a desktop or laptop computer, such computing device 18 may instead be a portable device such as a portable media player or personal data assistant, or a network computer, a server, a mini-computer, or other type of computer.

Note that in at least some instances, it may be the case that the computing device 18 upon which the application 12 and the components 14 thereof are to be installed cannot directly install such items. For example, it may be case that the computing device 18 is a portable device without direct access to the bootstrapper 16. In such a situation, the computing device 18 may be appropriately communicatively coupled to another computing device, such as for example a personal computer, and the another computing device with the bootstrapper 16 thereon may install the application 12 and components 14 thereof on the computing device 18. As should be appreciated, such an arrangement is considered to be within the spirit and scope of the present invention.

As will also be set forth in more detail below, an application developer developing an application 12 can configure the bootstrapper 16 to run an installer for a particular component 14 by authoring a manifest describing metadata about such installer, such as for example how to detect if the component 14 is already installed on the computing device 18, how to locate such installer, how to interpret return values from such installer, how to launch such installer, etc. The metadata from the manifest is then copied into the bootstrapper 16.

A user in possession of the bootstrapper 16 can then install the entire application 12 and components 14 thereof on a computing device 18 by running the bootstrapper 16 on such computing device 18. Once launched, the bootstrapper 16 among other things detects whether each such component 14 is already installed on the computing device 18, and also perhaps a version number thereof, and downloads or otherwise locates and installs each component 14 that is not on the computing device 14 in a current form based on the version number thereof. If a component 14 requires a reboot to complete installation thereof, the bootstrapper 16 prompts the user to reboot, and when the computing device 14 finishes the reboot the bootstrapper 16 continues.

Turning now to FIG. 3, it is seen that in one embodiment of the present invention, each component 14 includes several objects therein including several packaging-specific objects in order that such component 14 may be packaged by the packaging tool 10 with an application 12 into a bootstrapper 16. Such objects may appear within the component 14 in any appropriate form without departing from the spirit and scope of the present invention. For example, the component 14 may be in the form of XML (eXtensible Markup Language) code with each object being an identified sub-portion of such code. If desired, such code or at least a portion thereof may be encrypted and/or signed.

As should be appreciated, the developer of the component 14 has already prepared the component 14 to include such packaging-specific objects, thereby at least implicitly endorsing and enabling the component 14 to be in fact so packaged by the packaging tool 10. As should be appreciated, each object set forth as being included with the component 14 may instead be represented within the component 14 as a pointer or other reference without departing from the spirit and scope of the present invention. Such pointer or other reference for example may be to a remote location such as a network location where the object may be located.

The objects within the component 14 may include one or more objects comprising files with executable code for installing the component 14 on the computing device 18 of a user. In at least some instances, such file objects may include a global file with code and/or data that is global to all varieties of the component 14, and a local file with code and/or data that is local to a particular variety of the component 14. As may be appreciated, it may be that the local file is for a variety of the component 14 based on language, based on geographic or political location, based on type of user, and/or the like. At any rate, such local and global file objects are known or should be apparent to the relevant public and therefore need not be set forth herein in any detail. Such file objects may of course also include additional files.

The objects within the component 14 also include one or more packaging-specific objects setting forth code and/or data necessary and/or desirable for use in connection with the packaging tool 10 packaging the component 14 into a bootstrapper 16 and/or for use in connection with a bootstrapper 16 installing the component 14 on the computing device 18 of the user. Again, by including such packaging-specific objects with the component 16, the developer thereof enables such component 14 to be in fact so packaged by the packaging tool 10.

In one embodiment of the present invention, the packaging-specific objects in the component 14 include a system checks object including therein all code and/or data necessary to gather information about a computing device 18 upon which the component 14 is to be installed. As should be appreciated, the code and/or data in the system checks object is to be employed by the bootstrapper 16 to obtain data by which the bootstrapper 16 can determine among other things whether the component 14 is already installed on the computing device 18 and if so a version number, whether the computing device 18 has enough storage space to store the installed component 14, and the like. As should also be appreciated, the system checks object may perform such determination with reference to items of the computing device including a file system, a registry, a component list, or the like.

The packaging-specific objects in the component 14 additionally includes an installation conditions object including therein all code and/or data necessary to determine whether the component 14 should in fact be installed on the computing device 18 upon which the component 14 is to be installed. As should be appreciated, the code and/or data in the installation conditions object is in fact employed by the bootstrapper 16 along with the data as obtained with the system checks object and perhaps other data to determine whether the component should be installed. Thus, it may be the case that the system checks object finds that the component 14 is already installed and has a particular version number, but that the installation conditions object finds based on such version number that the component 14 should be re-installed as a more current version. Typically, the installation conditions object returns one of three results: install the component 14, do not install the component 14, or do not install and fail the installation of the application 12.

The packaging-specific objects in the component 14 may also include an installation command object which typically includes a command line by which the bootstrapper 16 orders that the component 14 be installed. Such command line of such installation command object typically includes the name of an executable and also any extensions, switches, and the like that should be included.

The packaging-specific objects in the component 14 may further include an exit behavior object including therein all code and/or data necessary to describe the result of the attempt to install the component 14, including whether a reboot is required. As should be appreciated, the bootstrapper 16 employs such information to determine how to proceed after such installation has in fact been attempted. Typically, the exit behavior object returns one of four results: the installation has succeeded, the installation has succeeded and a reboot is required, the installation has failed, and the installation has failed and a reboot is required. Thus, based on the returned result, the bootstrapper 16 performs a reboot if necessary, and can report back to the user whether the installation was successful. Note that if the installation was not in fact successful, the bootstrapper 16 may ask the user whether to re-attempt to install the component 14, or may fail the installation of the application 12, among other things.

The packaging-specific objects in the component 14 may still further include a reboot object including therein all code and/or data necessary to describe whether a reboot, if necessary according to the exit behavior object, should be an immediate reboot or can be a deferred reboot. The reboot object thus returns as a result that a reboot is needed now or can be deferred, and based thereon the bootstrapper 16 either performs a reboot if necessary or asks the user whether to perform a reboot now or let the user perform the reboot later.

In addition to the aforementioned packaging-specific objects, the component 14 may also include other packaging-specific objects for performing other functions and/or providing other data. For example, the component 14 may also have a display string object with all display strings that the bootstrapper 16 might present to the user, and a schedule object setting forth actions that must be taken by the bootstrapper 16 and an order therefor. In addition, the component 14 may have a dependencies object setting forth for the packaging tool 10 another component 14 that must be installed for the present component 14 to operate, another component 14 that cannot be installed on the same computing device 18 with the present component 14, whether another component 14 must be installed before the present component 14, and the like. Also, the component 14 may have an overrides object setting forth for the packaging tool 10 overrides with regard to other components 14, such as for example that another component 14 need not be installed if the present component 14 is installed, that the present component 14 need not be installed if another component 14 is installed, and the like.

As should now be appreciated, and significantly, the packaging-specific objects that are included within a component 14 are generally one of two types: those objects employed by the packaging tool 10 in constructing a bootstrapper 16 to include the component 14, and those objects employed by the bootstrapper 16 in attempting to install the component 14 on a computing device 18 of a user. Thus, such objects are employed both when packaging the component 14 into a bootstrapper 16 along with an application and when the bootstrapper 16 is in fact attempting to install the component 14. Of course, objects designated as being used by one of the packaging tool 10 and the bootstrapper 16 may also be employed by the other of the packaging tool 10 and the bootstrapper 16 without departing from the spirit and scope of the present invention, and at any rate a particular component 14 can specify only some of the aforementioned objects again without departing from the spirit and scope of the present invention.

Figure 4:
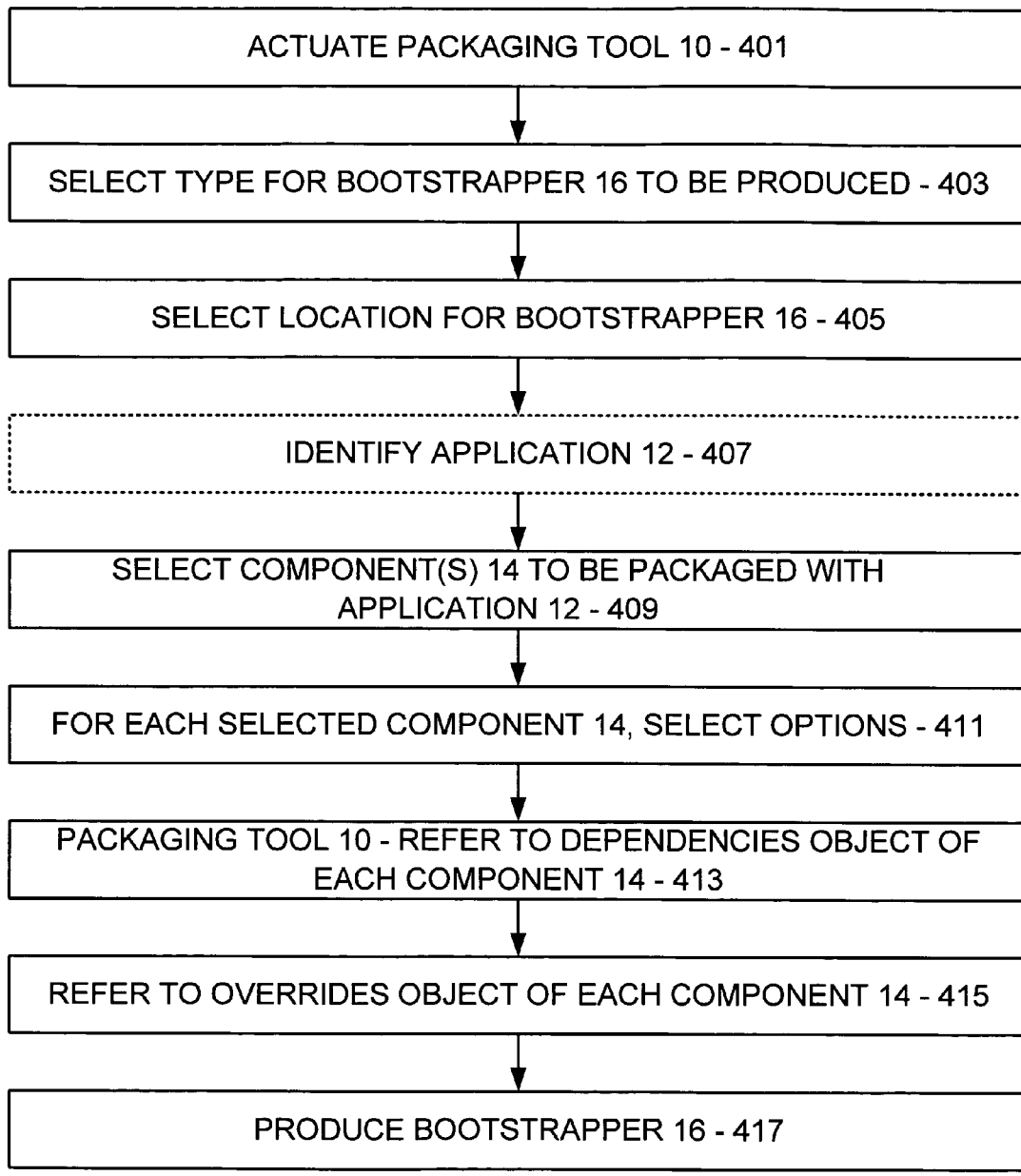
FIG. 4 is a flow diagram showing key steps performed by the packaging tool of FIG. 2 to produce the bootstrapper of FIG. 2 in accordance with one embodiment of the present invention.

In using the packaging tool 10 to package an application 12 and one or more components 14 into a bootstrapper 16, and turning now to FIG. 4, it is preliminarily presumed that a developer of the application 12 that is employing the packaging tool 10 or an agent of such developer has already gathered a plurality of the components 14, including the components 16 that are to go into the bootstrapper 16, and such gathered components 16 are in a location known to and accessible by the packaging tool 10. In addition or in the alternative, the packaging tool 10 as provided to the developer may be provided with one or more known locations from which such components 14 may be obtained.

At any rate, the developer upon actuating the packaging tool 10 (step 401) may be asked by such packaging tool 10 for an identification of a type for the bootstrapper 16 to be produced, in which case the developer responds with a selection from among one or more choices (step 403). As may be appreciated, such types for the bootstrapper 16 may be any appropriate types without departing from the spirit and scope of the present invention. For example, the type may be an executable, a batch file, a self extractor, or the like.

In addition, the developer may be asked by the packaging tool 10 whether the bootstrapper 16 as produced is to be available from a network location or a local file system location and may also ask for an identification of such location, in which case the developer responds with an appropriate selection and identification of location (step 405). Note here that such selection and location may or may not have a substantive effect on the produced bootstrapper 16.

Presumably, actuation of the packaging tool 10 takes place in connection with a particular application 12 of the developer, and such application 12 is thus at least inferentially identified to the packaging tool 10 in the course of such actuation. Of course, such application 12 could also be specifically identified by the developer (step 407) by way of an appropriate user interface. At any rate, at some point the developer of the application 12 must choose one or more components 14 to be packaged with the application 12 into the bootstrapper 16 to be produced.

Accordingly, in one embodiment of the present invention, the packaging tool 10 presents a list of at least some components 14 that may be packaged with the application 12 and the developer selects one or more of same (step 409). Note that the list of components 14 may be a list of all available components 14 from all available locations, or may be a sub-set thereof, such as for example a list of components 14 that have been verified and/or validated, a list of components 14 from a certain location, a list of components starting with a particular letter, a list of most-current components 14, or the like.

In connection with the developer of the application 12 selecting each component 14, the developer also is requested to and does select from one of a plurality of options for including the component 14 in the bootstrapper 16 (step 411). In particular, for each selected component 14, and based on any restrictions on the component 14 as set forth in a packaging-specific object therein, the developer may among other things specify that:

the component 14 be included with the bootstrapper 16;
the component 14 not be included with the bootstrapper 16 but instead be referenced within the bootstrapper 16 and accessed by the bootstrapper 16 thereby at install time;
the component 14 not be included with the bootstrapper 16 but instead attempt to be detected by the bootstrapper 16 on the computing device 18 of the user, and if not detected the bootstrapper is to halt installation of the application 12;
the component 14 not be included with the bootstrapper 16 but instead attempt to be detected by the bootstrapper 16 on the computing device 18 of the user, and if not detected the bootstrapper is to halt installation of the application 12 until a user agrees to navigate to a particular location, presumably to obtain the component 14; or
the component 14 not be included with the bootstrapper 16 and is not attempted to be detected or installed by the bootstrapper 16.

Note with regard to the last option that the developer can achieve the same result by simply not selecting the component 14 as at step 409. However, it may be appreciated that selecting but not installing the component 14 at least allows the component 14 to be taken into consideration when the packaging tool 10 considers dependencies, such as in connection with the dependencies object set forth above.

Significantly, in connection with the selection of each component 14 as at step 409, the packaging tool 10 refers to the packaging-specific objects therein. Specifically, and as should now be appreciated, the packaging tool 10 refers to any dependencies object of the component 14 to, again, determine whether another component 14 must be installed for the present component 14 to operate, whether another components 14 cannot be installed on the same computing device 18 with the present component 14, whether another component 14 must be installed before the present component 14, and the like, and reacts accordingly (step 413). In addition, the packaging tool 10 refers to any overrides object of the component 14 to, again, determine whether another component 14 need not be installed if the present component 14 is installed, whether the present component 14 need not be installed if another component 14 is installed, and the like, and acts accordingly (step 415).

Thus, once a developer has selected components 14 as at step 409 and steps 411-415 have also been completed, the packaging tool 10 should have a list of components 14, installation instructions for each component 14 on such list, and whether each component 14 on the list is to be included with the bootstrapper 16 or merely be referenced thereby, among other things. In addition, the packaging tool 10 may on its own have added or removed components 14 from the list and perhaps set an installation order for the components 14 on the list. Of course, the packaging tool 10 also has an identification of the application 12 to be installed by the bootstrapper 16, which presumably is to be installed after all components 14 of the bootstrapper 16 have been installed.

Thus, the packaging tool 10 in fact produces the bootstrapper 16 based on such information (step 417). In particular, for each ordered component 14 on the list, the packaging tool 10 places the installation instructions for the component 14 in the bootstrapper 16, including ordering information. As should be appreciated, if the component 14 is to be included with the bootstrapper 16, such component 14 is in fact placed in the bootstrapper 16, while if the component 14 is referenced only by the bootstrapper 16, such component 14 is in fact referenced.

Note, though, that even if only referenced, the bootstrapper 16 should be provided with all objects from the component 14 that are necessary when installing the component 14, as will be set forth in more detail below. Of course, the packaging tool 10 also places installation instructions for the application 12 in the bootstrapper 16, including ordering information, and if the application 12 is to be included with the bootstrapper 16, such application 12 is in fact placed in the bootstrapper 16, while if the application 12 is referenced only by the bootstrapper 16, such application 12 is in fact referenced.

Finally, the packaging tool 10 places within the bootstrapper 16 executable bootstrap code and/or data explaining how to follow the installation instructions for each component 14 and the application 12, as is shown in FIG. 5. As should be appreciated, such bootstrap code and/or data should be fairly generic or at least non-specific to any particular component 14, and with regard to each component 14 should instead call to the objects therefor as set forth in the bootstrapper 16 in the course of installing such component 14. Accordingly, such a 'bootstrap' likely is relatively small in size and should with regard to each component 14 operate for the most part by calling to objects of such component 14 as set forth in the bootstrapper 16. As a result, the bootstrapper 16 should be able to perform all functions necessary to install a component 14 by way of the bootstrap therein referring to the objects of such component 14, and the bootstrapper 16 and bootstrap thereof thus need not have any prior knowledge or 'hardwiring' with regard to any particular component 16.

Note that in at least some instances, the functionality with which a particular packaging-specific object of a component 14 is associated may be at least partially generic across all components 14. For example, it may be the case that the system checks object of all components 14 performs the same system check functionality, perhaps with minor variations based on the component 14 thereof, such as for example a specific registry key that is to be read. In such a situation, it may be the case that the object at issue only includes local data on the minor variation, such as the aforementioned specific registry key, and that the remainder of the global functionality associated with such object is included with the bootstrap of the bootstrapper 16. Thus, and as should be appreciated, the bootstrap calls to the object at issue to obtain therefrom the local data on the minor variation, and not for the object at issue to execute code thereof. More generally, it should now be appreciated that each packaging-specific object of a component 14 may have as much or as little 'local' executable code and/or data relating to the functionality thereof as deemed necessary without departing from the spirit and scope of the present invention, with the remainder of the 'global' code and/or data being elsewhere, such as for example in the bootstrap of the bootstrapper 16.

As should be appreciated, the actual construction of the bootstrapper 16 as shown in FIG. 5 may take any appropriate form without departing from the spirit and scope of the present invention, depending of course on the selected type of the bootstrapper 16. Such construction may therefore include any appropriate compiling, code obfuscation, code maximizing, encryption, signing, and the like. Details of such functions are known or should be apparent to the relevant public and therefore need not be set forth herein in any detail.

Figure 6:
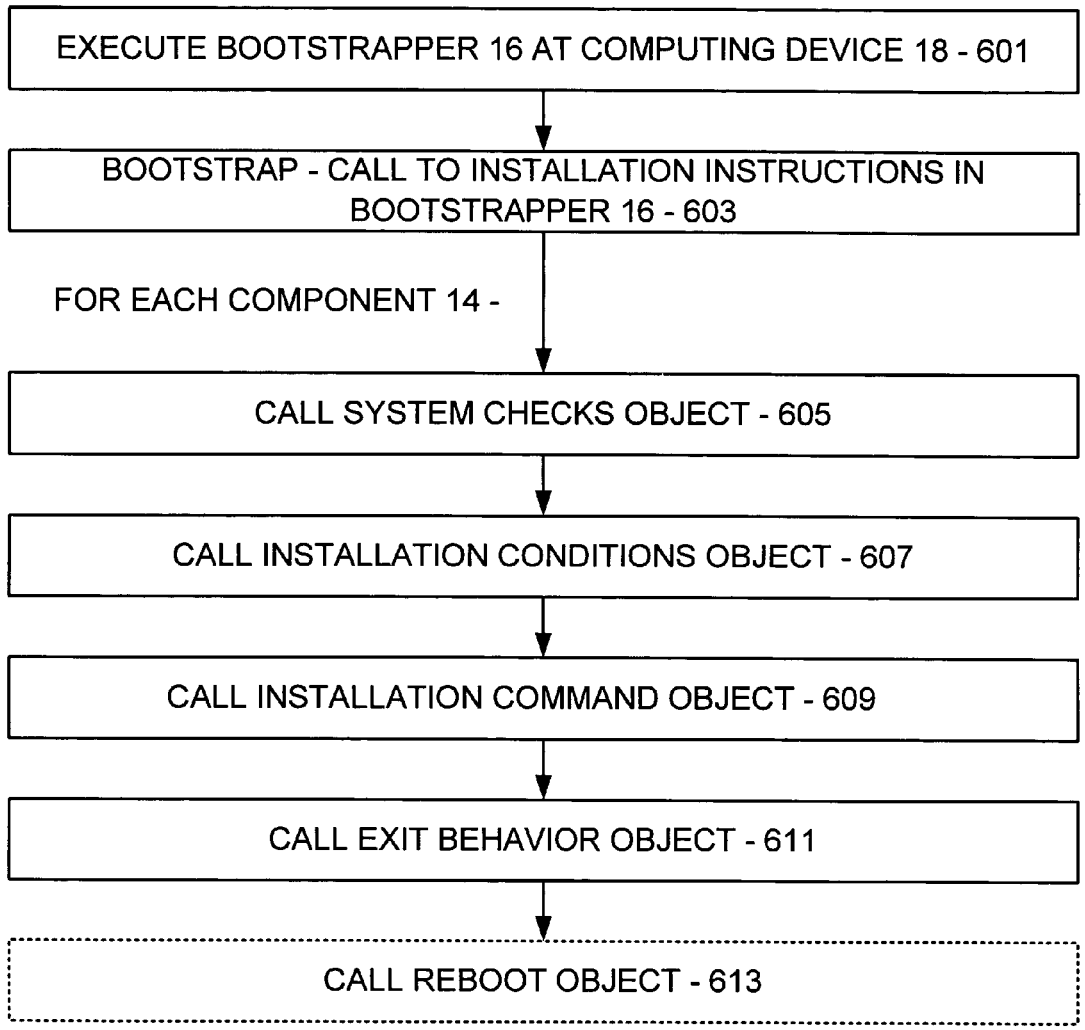
FIG. 6 is a flow diagram showing key steps performed by the bootstrapper of FIG. 2 to install the application and each component thereof on the computing device of FIG. 2 in accordance with one embodiment of the present invention.

As may now be appreciated, and turning now to FIG. 6, use of the bootstrapper 16 as produced by the packaging tool 10 merely involves a user at a computing device 18 executing same (step 601) to actuate the bootstrap within such bootstrapper 16, and the bootstrap thereafter calls to the installation instructions for each component 14 in the bootstrapper 16, including ordering information (step 603). Thus, for each component 14, the bootstrap calls to the packaging-specific objects thereof to install such component 14.

In particular, the bootstrap calls to the system checks object to gather information about the computing device 18 upon which the component 14 is to be installed (step 605), and calls to the installation conditions object to determine whether the component 14 should in fact be installed on the computing device 18 (step 607). Presuming that installation is allowed, the bootstrap then calls to the installation command object for the command line by which to order that the component 14 be located and installed (step 609), and then to the exit behavior object to describe the result of the attempt to install the component 14, including whether a reboot is required (step 611). If so, the bootstrap calls to the reboot object to describe whether the reboot should be immediate or deferred (step 613).

Although not necessarily the case in all implementations of the present invention, it is envisioned that the bootstrapper 16 is a relatively small file, perhaps no more than 400 kilobytes in size. Accordingly, the bulk of the components 14 and the application 12 likely are not included within the bootstrapper 14 but instead are referenced thereby, such as for example at a pre-determined network location.

In addition, the bootstrapper 16 verifies and/or validates each of the components 14 and the application 12 by checking signatures and/or hashes, among other things. Typically, the bootstrapper 16 should handle reboots gracefully, and in the event an installation fails the bootstrapper 16 at a minimum provides a log file. Also typically, the bootstrapper 16 does not provided an integrated uninstall procedure, but instead relies on any uninstall procedure provided by each of the components 14 and the application 12.

CONCLUSION

The present invention may be practiced with regard to any appropriate application 12 and components 14 therefor. As should now be appreciated, with the present invention as set forth herein, an application 12 can be packaged into a bootstrapper 16 with any components 14 that support the packaging tool 10 that produces such bootstrapper 16.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful packaging tool 10 that is extensible to support installation of almost any version of any component 14 with an application 12. Each component 14 includes therewith all packaging information necessary for the packaging tool 10 to package such component 14 with an application 12. Thus, such packaging tool 10 can package any such component 14 with an application 12 based on the packaging information for such component 14 as obtained from such component 14.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method of packaging an application and each of at least one component to be available for use in connection with the application into a package, the package to be distributed to a user and executed on a computing device of the user to install the application and each component on such computing device, the method comprising:
   receiving a type of the package;
   receiving a location where the package is to be stored;
   receiving a selection of each component to be packaged with the application;
   for each selected component, referring to at least one packaging-specific object in such component to determine information on at least one of how to package the component in the package or how to install the component on the computing device of the user, the at least one packaging-specific object in such component including:
      a dependencies object to determine whether another component must be installed for the component to operate, whether another component cannot be installed on the same computing device with the component, or whether another component must be installed before the present component;
      an overrides object to determine whether another component need not be installed if the present component is installed or whether the present component need not be installed if another component is installed;
      an installation conditions object to determine that the component should in fact be installed on the computing device;
      an installation command object to execute a command line by which to order that the component be located and installed; and
      an exit behavior object to describe a result of the installation of the component; and
   producing the package based on the received type and location for the package, the received selection of each component, and the determined information from the at least one packaging-specific object of each component.

2. The method of claim 1 comprising receiving the type of the package selected from a group consisting of an executable, a batch file, and a self extractor.

3. The method of claim 1 further comprising receiving an identification of the application.

4. The method of claim 1 comprising presenting a list of components that may be packaged with the application and receiving the selection of each component to be packaged with the application based on such list.

5. The method of claim 1 further comprising receiving for each selected component a selection of an option for including the component in the package from a group comprising the component being included within the package and the component being referenced within the package and accessed by the package based on such reference.

6. The method of claim 1 comprising producing the package to include for each of the application and each selected component one of such item and a reference to such item.

7. The method of claim 6 comprising producing the package to further include at least one of executable bootstrap code or data detailing how to install the application and each selected component from the package onto the computing device of the user.

8. The method of claim 7 wherein each component includes at least one packaging-specific object detailing how to install the component on the computing device of the user, the method comprising producing the package to include for each selected component the at least one packaging-specific object thereof detailing how to install such component on the computing device of the user, and at least one of executable bootstrap code or data that refers to such packaging-specific object to determine how to in fact install the component on the computing device of the user.

9. The method of claim 7 comprising producing the package to include at least one of executable bootstrap code or data that is generic and non-specific to any particular component.

10. A method for an executed package to install an application and each of at least one component to be available for use in connection with the application onto a computing device of a user, the method comprising, for each component:
calling to an installation conditions object in the component and within the package to determine that the component should in fact be installed on the computing device;
calling to an installation command object in the component and within the package to execute a command line by which to order that the component be located and installed;
calling to a dependencies object to in the component and within the package to determine whether another component must be installed for the component to operate, whether another component cannot be installed on the same computing device with the component, or whether another component must be installed before the present component;
calling to an overrides object in the component and within the package to determine whether another component need not be installed if the present component is installed or whether the present component need not be installed if another component is installed; and
calling to an exit behavior object in the component and within the package to describe a result of the installation of the component.

11. The method of claim 10 wherein the exit behavior object describes that a reboot is required, and further comprising calling to a reboot object of the component and within the package to describe whether the reboot should be immediate or deferred.

12. The method of claim 10 further comprising, for each component, calling to a system checks object of the component and within the package to gather information about the computing device upon which the component is to be installed.

13. A computer-readable medium having stored thereon computer code representative of a package to be executed to install an application and each of at least one component to be available for use in connection with the application onto a computing device of a user, the package including, for each component:
an installation conditions object in the component to be called to determine that the component should in fact be installed on the computing device;
an installation command object in the component to be called to execute a command line by which to order that the component be located and installed;
a dependencies object in the component to determine whether another component must be installed for the component to operate, whether another component cannot be installed on the same computing device with the component, or whether another component must be installed before the present component;
an overrides object in the component to be called to determine whether another component need not be installed if the present component is installed or whether the present component need not be installed if another component is installed; and
an exit behavior object in the component to be called to describe a result of the installation of the component.

14. The medium of claim 13 wherein the exit behavior object describes that a reboot is required, and wherein the package further comprises a reboot object of the component to be called to describe whether the reboot should be immediate or deferred.

15. The medium of claim 13 wherein the package further comprises a digital signature of the component by which the component may be validated.

16. The medium of claim 13 wherein the package further comprises one of the application and a reference to a location from which the application may be accessed by the package based on such reference.

17. The medium of claim 13 wherein the package further comprises a system checks object of the component to be called to gather information about the computing device upon which the component is to be installed.

18. A computer-readable medium having stored thereon computer code representative of a component to be packaged with an application into a package to be executed to install the application and the component onto a computing device of a user such that the component is available for use in connection with the application on the computing device, the component including:
an installation conditions object to be called to determine that the component should in fact be installed on the computing device;
an installation command object to be called to execute a command line by which to order that the component be located and installed;
a dependencies object to be called to determine whether another component must be installed for the component to operate, whether another component cannot be installed on the same computing device with the component, or whether another component must be installed before the present component;
an overrides object to be called to determine whether another component need not be installed if the present component is installed or whether the present component need not be installed if another component is installed; and
an exit behavior object to be called to describe a result of the installation of the component.

19. The medium of claim 18 wherein the exit behavior object describes that a reboot is required, and wherein the component further comprises a reboot object of the component to be called to describe whether the reboot should be immediate or deferred.

20. The medium of claim 18 wherein the component further comprises a digital signature by which the component may be validated.

21. The medium of claim 18 wherein the component further comprises operating code for the component.

22. The medium of claim 18 wherein the component further includes a display string object with all display strings that the package may present to the user.

23. The medium of claim 18 wherein the component further includes a system checks object to be called to gather information about the computing device upon which the component is to be installed.

* * * * *